Feb. 17, 1925.
W. C. YOUNKER ET AL
1,527,148
LEAKAGE DISCHARGE VALVE
Filed Feb. 28, 1924  4 Sheets-Sheet 1
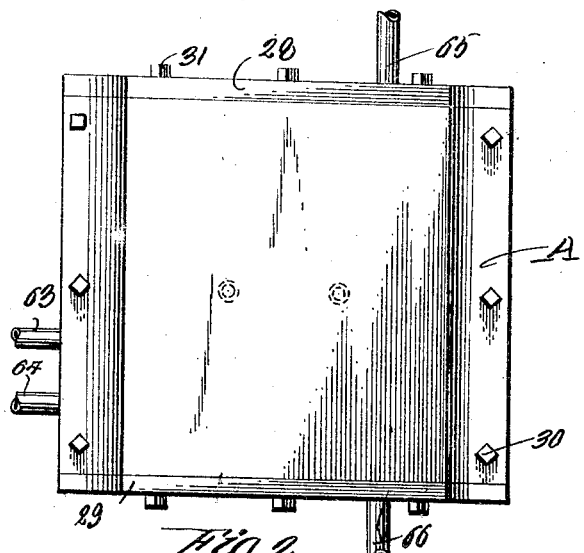
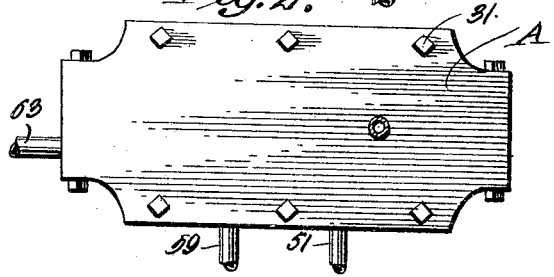
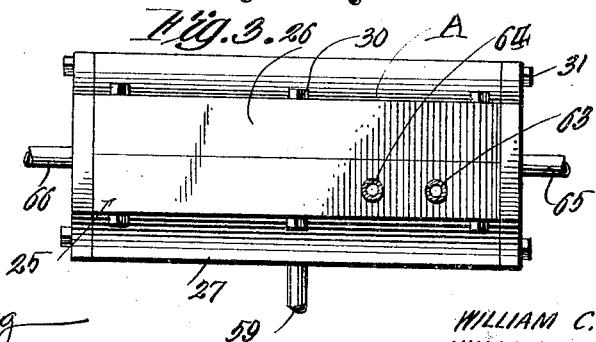
WITNESSES
Inventor
WILLIAM C. YOUNKER
WILLIAM E. BROWN
BY
Attorney

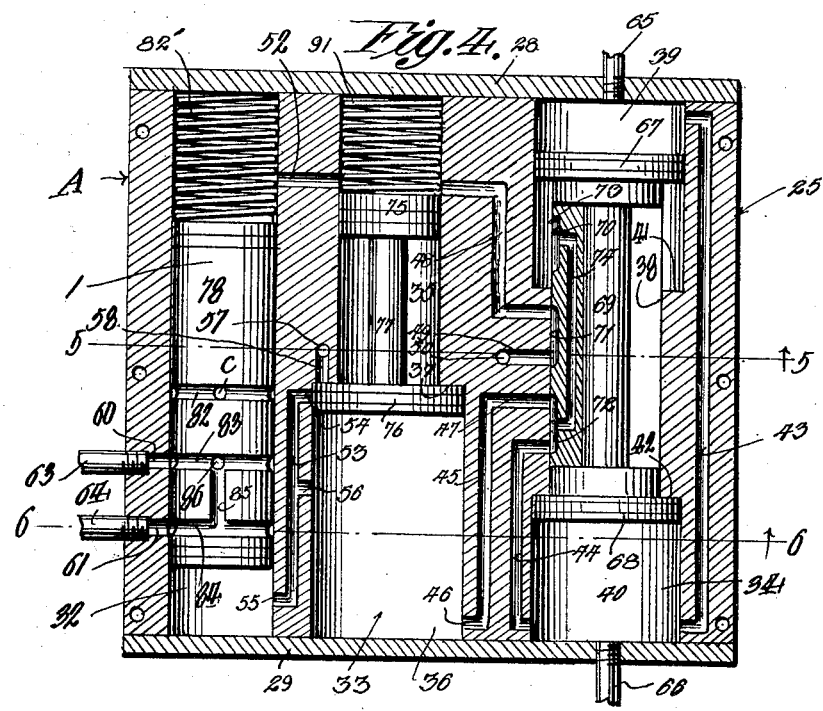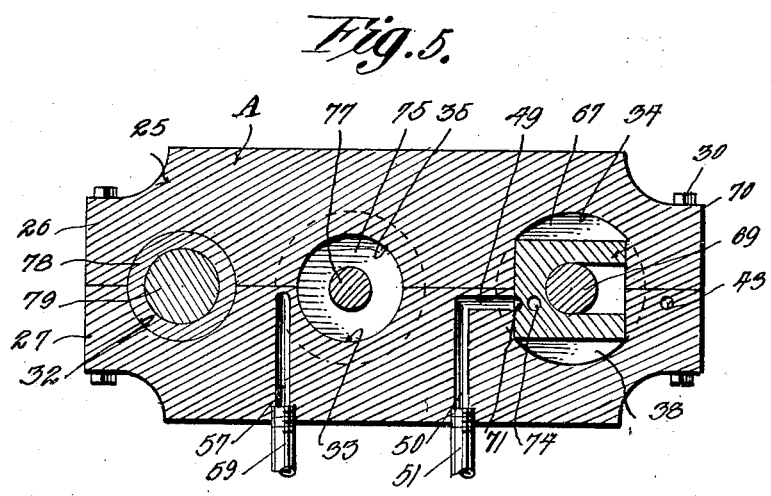

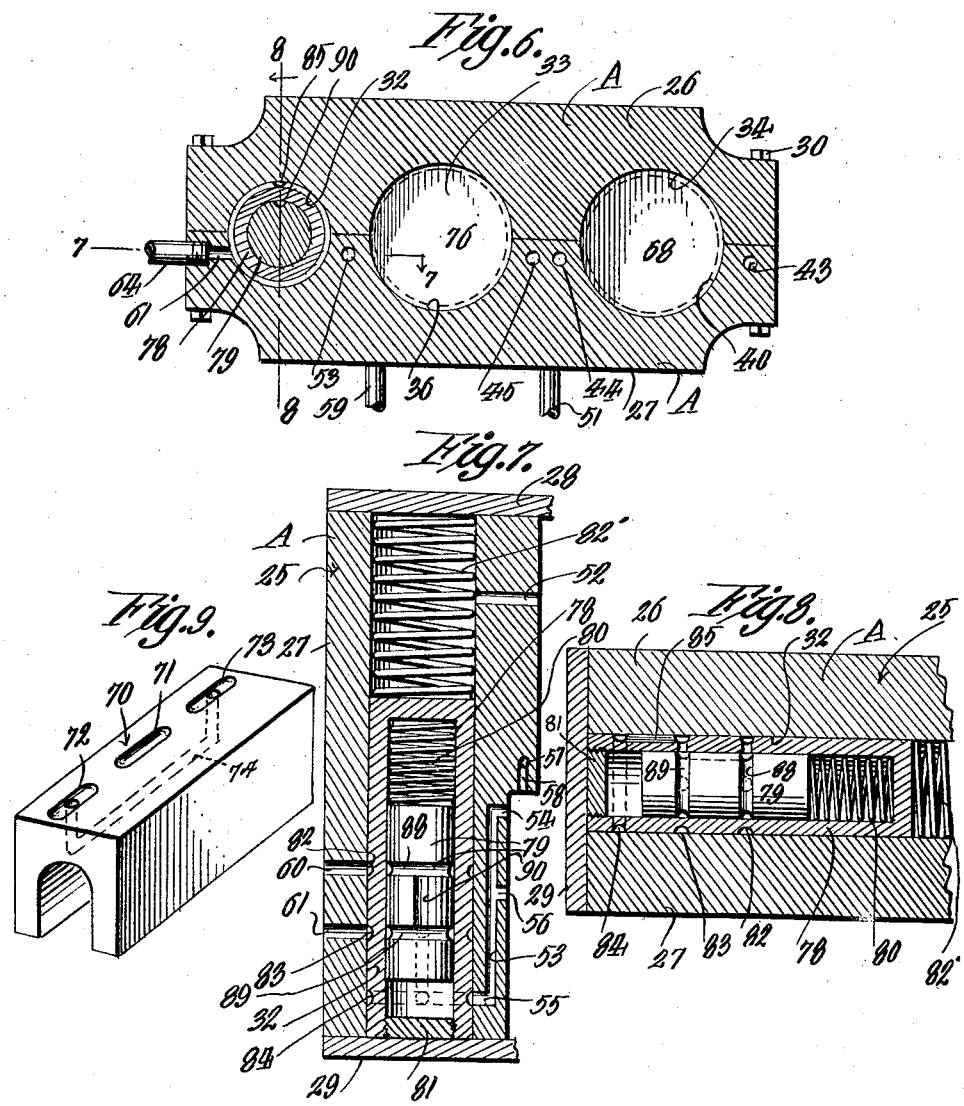

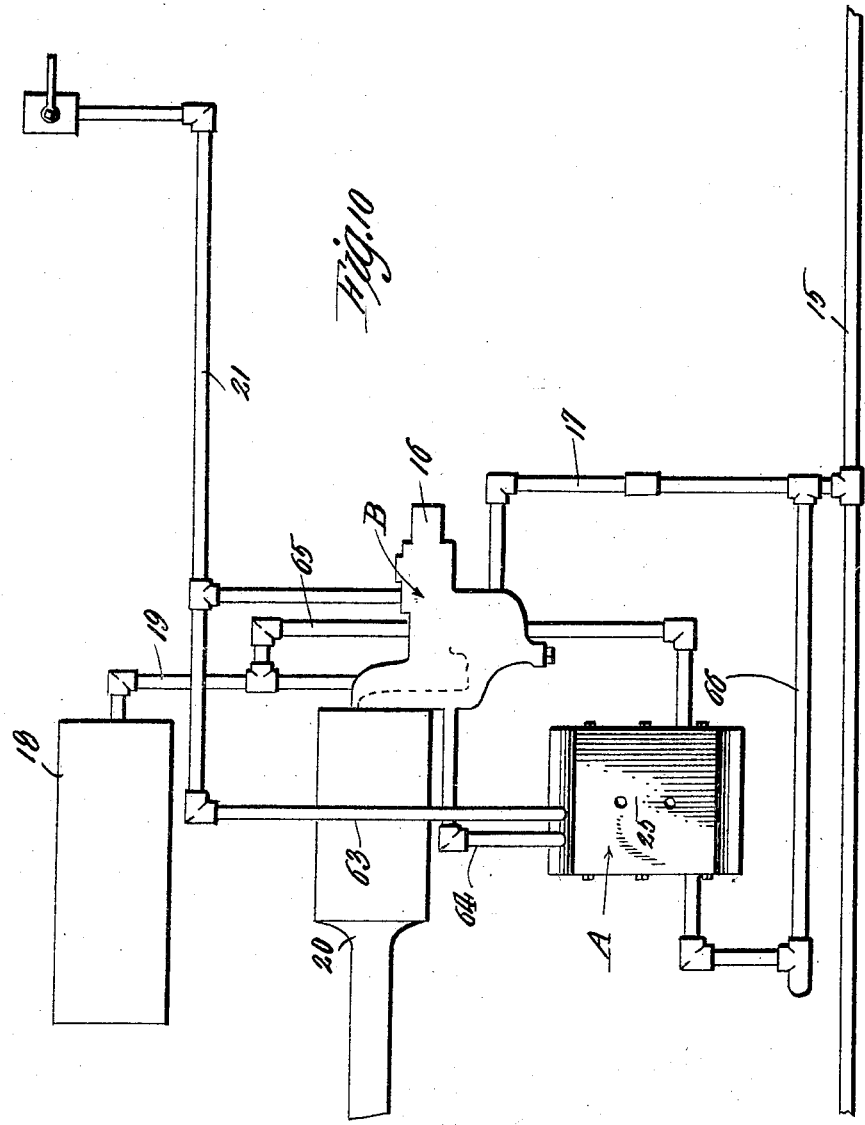

Patented Feb. 17, 1925.

1,527,148

UNITED STATES PATENT OFFICE.

WILLIAM C. YOUNKER AND WILLIAM E. BROWN, OF MASON CITY, IOWA.

LEAKAGE-DISCHARGE VALVE.

Application filed February 28, 1924. Serial No. 695,780.

*To all whom it may concern:*

Be it known that we, WILLIAM C. YOUNKER and WILLIAM E. BROWN, citizens of the United States, residing at Mason City, in the county of Cerro Gordo and State of Iowa, have invented certain new and useful Improvements in a Leakage-Discharge Valve, of which the following is a specification.

This invention appertains to automatic air brake systems of the type embodying auxiliary reservoirs connected with the various brake cylinders and the primary object of this invention is to provide a novel attachment for such systems, which is so constructed as to automatically keep the brakes in their full released position and to effectively prevent the brakes from creeping to their set or brake position regardless of an overcharged auxiliary reservoir or a leaky triple valve, while the automatic brake valve is in its released or running position.

Another object of the invention is to provide a novel device for effectively preventing the creeping on of the brakes, which will not effect the operation of the triple valve or other parts of the air brake system and which can be incorporated with the ordinary air brake system without any change in the working parts thereof.

A further object of the invention is to provide an improved device of the above character, which will be durable and efficient in use, one that will be simple and easy to manufacture, and one which can be placed upon the market and incorporated with an air brake system at a minimum cost.

With these and other objects in view, the invention consists in the novel construction, arrangement and formation of parts, as will be hereinafter more specifically described, claimed and illustrated in the accompanying drawings, in which drawings:

Figure 1 is a side elevation of the improved air brake system attachment.

Figure 2 is an end elevation of the same.

Figure 3 is an edge elevation of the attachment.

Figure 4 is a central longitudinal section through the improved attachment.

Figure 5 is a section taken centrally through the attachment on the line 5—5 of Figure 4.

Figure 6 is a section through the improved attachment taken on the line 6—6 of Figure 4.

Figure 7 is a section taken on the line 7—7 of Figure 6 illustrating the construction of the discharge valve.

Figure 8 is a section taken on the line 8—8 of Figure 6 at right angles to Figure 7 illustrating the construction of the discharge valve.

Figure 9 is a detail perspective view of the slide valve carried by and operated from the double control piston.

Figure 10 is a fragmentary diagrammatic view of an automatic air brake system showing the improved attachment incorporated therewith.

Referring to the drawings in detail, wherein similar reference characters designate corresponding parts throughout the several views, the letter A generally indicates the improved automatic air brake attachment which is adapted to be associated with the ordinary type of automatic air brake system B, a portion of which has been shown diagrammatically in Figure 10 of the drawings.

The system B as shown includes the usual brake or train pipe 15, the triple valve 16, which is connected by a pipe 17 with the train pipe, the auxiliary reservoir 18 which is connected by a suitable pipe 19 with the triple valve 16; the brake cylinder 20 which is also connected to the triple valve; and the triple valve release pipe 21 which leads from the said triple valve 16.

The improved attachment A comprises a casing 25 which can be constructed in any desired way and formed from any preferred material. As shown the casing 25 includes two body sections 26 and 27 of like construction and closure end plates 28 and 29. The companion body portions 26 and 27 of the casing 25 can be bolted together as at 30, and the end plates 28 and 29 can be secured to the body portions by suitable machine screws or the like 31.

Cylindrical chambers 32, 33 and 34 are formed within the body portions 26 and 27 and the end plates 28 and 29 constitute the closures for the said chambers. The cylindrical chamber 33 at a point intermediate its ends is reduced in diameter to provide a cylinder 35 and a cylinder 36 and a stop shoulder 37 is formed between the said cylinders.

The chamber 34 also has its central portion reduced in diameter to provide a central slideway 38 and end cylinders 39 and 40. This also provides stop shoulders 41 and 42.

By referring to Figure 4 of the drawings, it can be seen that the cylinders 39 and 40 are connected by a channelway 43 for a purpose, which will be hereinafter more fully described. The opposite wall of the chamber 34 is provided with a channel 44 which connects the cylinder 40 with one end of the guideway 38. The cylinder 36 of the chamber 33 is also connected with the guideway 38 by a suitable channel 45 and ports 46 and 47. The cylinder 35 of the chamber 33 is in turn connected with the guideway 38 of the chamber 34 by suitable channel 48. A channel 49 connects the guideway 38 with an exhaust port 50 which extends transversely of the casing and this exhaust port 50 can have connected therewith a suitable exhaust pipe 51 if so desired. The cylinder 35 of the chamber 33 has one end thereof connected with the companion end of the chamber 32 by a suitable passageway 52. A channelway 53 and ports 54 and 55 are utilized for connecting the inner ends of the cylinder 36 of the chamber 33 with one end of the chamber 32 and a port 56 also communicates with the channel 53 at a point intermediate its ends. This port leads into the central portion of the cylinder 36. The cylinder 33 has its inner end also communicating with an exhaust port 57 through a suitable channel 58 and this exhaust port can be provided with a suitable exhaust pipe 59 if so desired.

The chamber 32 is provided adjacent to one end thereof with a pair of spaced ports 60 and 61. The port 60 has connected therewith a pipe 63, which leads to the triple valve release pipe 21 of the air brake system B as clearly shown in Figure 10 of the drawings. The port 61 has connected therewith a pipe 64, which leads to the brake cylinder 20 through the triple valve 16 as can be clearly seen by also referring to Figure 10 of the drawings. The end plate 28 supports a pipe 65 which leads into the outer end of the cylinder 39 and this pipe is connected with the pipe 19 which leads to the auxiliary reservoir 18 of the automatic air brake system.

The end plate 28 has communicating therewith a lead pipe 66 which communicates with the outer end of the cylinder 40 and this pipe communicates with the train or brake pipe 15 of the said air brake system.

Pistons 67 and 68 are mounted respectively within the cylinders 39 and 40 and these pistons are connected together by a suitable rigid piston rod 69. It therefore can be seen that the pistons 67 and 68 will operate synchronously. Arranged on the rod 69 between the pistons 67 and 68 is disposed a slide control valve 70 which is adapted to reciprocate back and forth in the guideway 38 hereinbefore referred to. This slide valve 70 is provided with a central slot 71 and end slots 72 and 73. These slots 71, 72 and 73 are arranged in longitudinal alignment and in spaced relation and the end slots 72 and 73 are connected together by a suitable channelway 74. It is to be noted that the face of the slide valve 70 which is provided with the groove slots 71, 72 and 73 is disposed in facial abutment with the wall of the guideway 38 which is provided with the ports and channelways 47, 49 and 48.

Pistons 75 and 76 are mounted respectively within the cylinders 35 and 36 of the cylindrical chamber 33 and these pistons 75 and 76 are also connected together by a rigid piston rod 77 so as to permit the same to move synchronously. The piston 76 is of a relative larger diameter than the piston 75 and both of the pistons are preferably provided with piston rings for making a snug contact with the walls of their respective cylinders.

A novel discharge valve mechanism is reciprocably mounted within the chamber 32 and this discharge valve mechanism embodies a hollow outer discharge valve 78 and an inner reciprocatory discharge valve 79 which as shown is disposed directly within the outer discharge valve 78. This valve 79 is normally maintained at one end of the discharge valve 78 by a suitable expansion spring 80 which is preferably tensioned to withstand about twenty pounds pressure. This of course is clearly optional depending upon the air pressure used in the system. The inner discharge valve 79 is maintained within the outer discharge valve 78 by a suitable plug or the like 81. The discharge valve 78 is maintained in one end of the chamber 32 by a suitable expansion spring 82' which can be adjusted to a tension of twenty-five pounds. As shown, the outer discharge valve 78 is provided with three annular channels 82, 83, and 84. The annular channels 83 and 84 are connected by a longitudinally extending channel 85 and the central annular channel 83 communicates with the interior of the discharge valve 78 by a suitable radially extending port 86. The annular channel 82 communicates with the interior of the discharge valve 78 by a port 87. The inner discharge valve 79 is provided with a pair of spaced annular channels 88 and 89 which communicate with one another through a longitudinally extending channel 90. An expansion spring 91 is mounted within the cylinder 35 and bears against the outer face of the piston 75 so as to normally maintain the piston 75 adjacent to the cylinder 36 and the piston 76 at the outer end of the cylinder 33.

In operation of the improved attachment, when the automatic brake valve (not shown) is in holding, lap, service or emergency position, and when a service application is made with the automatic brake valve, the brake or train pipe air pressure is lessened in the usual way and the auxiliary reservoir air pressure becomes greater than the pressure in the said train or brake pipe. Thus the air pressure in the cylinder 39 moves the piston 67 inwardly and the piston 68 toward the outer end of its cylinder 40 until the piston 68 overlies the adjacent end of the equalizing channel 43 which closes the same. At the same time, the shoulder on the piston 67 moves the slide valve 70 toward the cylinder 40 and registers port 47 with exhaust port 49 through the central slot 71 in the slide valve 70 and permits the air in cylinder 36 to escape to the atmosphere through port 46, channel 47, port 47 slot 71 and an exhaust port 50.

During this operation the piston 76 in cylinder 36 moves toward the outer end of this cylinder and closes port 56 which leads to the channelway 54, and opens port 54 and allows air from the chamber 32 to escape to the atmosphere through port 55, channel 53, port 54, port 58 and exhaust port 57.

The port 61 is closed before the air reaches the brake cylinder in service applications. During this operation channel 48 registers with channel 44 through slots 72 and 73 and the channelways 74 in the slide valve 70. This allows the train or brake pipe air to flow into cylinder 35 and then through channel 52 into the chamber 32 between the discharge valve 78 and the cap plate 28. The combined spring and air pressure moves piston 75 and discharge valve 78 downwardly (referring to Figure 4 of the drawings).

The device remains in this position as long as the automatic valve is in service or emergency position.

When the automatic brake valve of the air brake system B is put in release or running position, the train or brake pipe air enters into the pipe 66 into the cylinder and forces the piston 68 inwardly and the piston 67 to the outer end of its cylinder. During this movement of the pistons, the slide valve 70 is shifted to a position shown in Figure 4 of the drawings which aligns the slots 71 and 72 in the slide valve 70 respectively with the channel 48 and the port 49 and the port 47 with the channelway 44. The air from the brake or train pipe can now flow to the auxiliary reservoir through the equalizing channel 43 and pipe 65. The air from the train pipe can now also flow through the channel 44, slot 72 in the slide valve to the port 47, channel 45, port 46 into the cylinder 36, which forces the piston 76 upwardly and permits the air from the train or brake pipe to enter port 56 into the channel 53 into the chamber 32 which forces the discharge valve 78 upwardly. This registers ports 60 and 61 with channelways 83 and 84. Thus these pipes can now communicate with one another. Thus any accumulation of air in the brake cylinder can be discharged therefrom the pipe 63 which leads to the triple valve release pipe 21. The discharge valve is in this position at all times, when the automatic brake valve (not shown) of the air brake system is in release or running position. During this movement the channels 48 and exhaust port 50 communicate through slots 73 in the slide valve and permits air from the cylinder 35 to escape to the air.

The purpose of the inner discharge valve 78 is to permit the functioning of the attachment should the exhaust port 56 become clogged with snow or ice, and thus not permit the air in the chambers 32 and the cylinder 45 to discharge to the atmosphere. Should the exhaust port 50 become clogged with ice or snow and the air in the chamber 32 between the end cap 28 and discharge valve 78 and the air in the cylinder 35 could not escape to the atmosphere, the combined air and spring pressure in the said chamber and cylinder would be greater than the brake pipe pressure against the opposite ends of the valve and piston 76 and would not be able to force the discharge valve 78 upwardly. In this way it will be able to force the discharge valve 79 upwardly and compress its spring which will then permit brake cylinder connection through pipe 64 and triple valve release pipe connection through pipe 63 to register through slot groove 83 and ports 86 in the discharge valve 78 through channels 88 and 89 and way 90 in the discharge valve 79, then through port 87, channel 82 to said triple valve release pipe.

The channel 43 functions to keep the train pipe air and auxiliary reservoir air equalized at all times while the automatic brake valve is in release or running position.

The leakage discharge valve is to keep the air equalized between the brake pipe 66 and auxiliary reservoir and to bleed off air, if any, should get into the brake cylinder, while the automatic brake valve (not shown) of the air brake system B is in release or running position.

From the foregoing description, it can be seen that we have provided novel means for permitting the effective bleeding of air from the brake cylinder when the air brake system is in its running or released position, so as to effectively prevent the brakes from creeping on to their set or braking position.

Changes in details may be made without departing from the spirit or the scope of this invention.

What we claim as new is:

1. The combination with an automatic air brake system including an auxiliary reservoir, a brake cylinder, a train pipe, a triple valve and a triple valve release pipe, of an attachment for the system embodying a casing having communication with the triple valve release pipe and the brake cylinder, a reciprocatory valve arranged within the casing having means for allowing communication between the brake cylinder and triple valve release pipe when the valve is in one position, means for controlling the entrance of air pressure to the exhaust valve for controlling the position thereof including a double piston reciprocably mounted within the casing, and means connecting the train pipe and auxiliary reservoir with the opposite end of the casing whereby the air pressure in the auxiliary reservoir and drain pipe can act on the opposite ends of said double piston.

2. The combination with an air brake system including a train pipe, a brake cylinder, an auxiliary reservoir therefor, a triple valve and a triple valve release pipe, of an attachment for the air brake system embodying a casing, lead pipes connecting the triple valve release pipe and the brake cylinder to the casing at spaced points, a discharge valve reciprocably mounted within the casing having means for permitting the connection of the brake cylinder and triple valve release pipe together when the same is in one position, spring means normally holding the valve in another position, a reciprocatory double piston mounted within the casing, means connecting the train pipe with the casing for permitting the air of the train pipe to act on one end of the piston, means connecting the auxiliary reservoir with the casing to permit the air of the auxiliary reservoir to act on the other end of the piston, an intermediate reciprocatory double piston mounted between the discharge valve in the first mentioned double piston, ports connecting the piston chambers with the chamber of the discharge valve, for permitting the escape of air from the cylinder of the first mentioned double piston to the discharge valve when the double piston is in one position for permitting the operation of the discharge valve against its spring means for establishing communication between the brake cylinder and the triple valve release pipe, and for permitting the escape of pressure on the opposite sides of the discharge valve and the adjacent sides of the second mentioned double piston to the atmosphere, and means for permitting the release of pressure from the discharge valve and the intermediate second mentioned double piston when the air of the train pipe falls below the pressure in the auxiliary reservoir.

3. In an attachment for automatic air brake systems for preventing the creeping on of the brakes when the system is in its running or released position comprising a casing including a discharge valve chamber, an end piston chamber and an intermediate piston chamber, the piston chambers including oppositely disposed piston cylinders, a double piston mounted in each piston chamber, a discharge valve reciprocably mounted in the discharge valve chamber, a slide valve carried by the outer double piston, a channel connecting the cylinders of the outer piston chambers together, pipes connected with the opposite ends of the piston cylinders adapted to lead from the train pipe of the air brake system and from the auxiliary reservoir of said system, spaced pipes communicating with the discharge valve chamber adapted to lead from the brake cylinder and the triple valve release pipe of the brake system, the outer piston chamber having a slideway disposed between the cylinders, a channelway connecting the outer end of one cylinder with the guideway, a channelway connecting the guideway with one cylinder of the intermediate cylinder chamber, a channelway connecting the mentioned cylinder of the intermediate piston chamber with one end of the valve chamber, an exhaust port disposed between the intermediate piston chamber and the valve chamber communicating with said intermediate piston chamber, means connecting the discharge valve chamber and the intermediate cylinder chamber together, a second discharge port arranged between the intermediate and the outer cylinder chambers, and communicating with the outer cylinder chamber, means connecting the opposite ends of the slide valve, the slide valve having an intermediate groove between said means, the discharge valve having an intermediate groove between said means, the discharge valve having ways formed therein for permitting the connection of the triple valve release pipe and the brake cylinder together when the discharge valve is in its one position, and spring means engaging one end of the discharge valve and the intermediate double piston.

4. In an attachment of the character described for automatic air brake systems, the casing having a discharge valve chamber therein, a hollow discharge valve reciprocably mounted in the chamber, spring means normally urging the valve to one end of the casing, the hollow discharge valve having spaced annular grooves formed therein, and a longitudinal groove connecting two of the annular grooves together, the hollow discharge valve also having radially extending ports communicating with two of said annular ways, and a reciprocatory inner discharge valve mounted within the hollow discharge valve, spring means normally urging the inner discharge valve to one end of the hollow discharge valve, the hollow discharge valve having a pair of spaced connected annular ways, as and for the purpose specified.

In testimony whereof we affix our signatures in presence of two witnesses.

WILLIAM C. YOUNKER.
WILLIAM E. BROWN.

Witnesses:
FRANK G. MURPHY,
O. T. DAWSON.